(12) United States Patent
Dusenbury, Jr.

(10) Patent No.: US 6,189,101 B1
(45) Date of Patent: Feb. 13, 2001

(54) SECURE NETWORK ARCHITECTURE METHOD AND APPARATUS

(76) Inventor: Richard G. Dusenbury, Jr., 1501 Madison Ave., Florence, SC (US) 29501

(*) Notice: Under 35 U.S.C. 154(b), the term of this patent shall be extended for 0 days.

(21) Appl. No.: 08/957,731

(22) Filed: Oct. 24, 1997

(51) Int. Cl.[7] .................................................. G06F 13/00
(52) U.S. Cl. ........................................... 713/201; 713/162
(58) Field of Search .................................... 713/200, 167, 713/201, 166, 202, 162; 380/3, 4, 24, 25, 30, 201, 202

(56) References Cited

U.S. PATENT DOCUMENTS

| | | | |
|---|---|---|---|
| 4,326,098 | 4/1982 | Bouricius et al. | 380/25 |
| 4,920,483 | 4/1990 | Pogue et al. | 395/421.09 |
| 5,016,162 | 5/1991 | Epstein et al. | 395/775 |
| 5,077,795 | 12/1991 | Rourke et al. | 380/55 |
| 5,109,384 | 4/1992 | Tseung | 371/32 |
| 5,163,131 | 11/1992 | Row et al. | 395/200.01 |
| 5,189,700 | 2/1993 | Blandford | 380/23 |
| 5,226,079 | 7/1993 | Holloway | 380/25 |
| 5,287,537 | 2/1994 | Newmark et al. | 395/800 |
| 5,295,188 | 3/1994 | Wilson et al. | 380/30 |
| 5,351,293 | 9/1994 | Michener et al. | 380/21 |
| 5,355,453 | 10/1994 | Row et al. | 395/200.09 |
| 5,485,409 | 1/1996 | Gupta et al. | 395/186 |
| 5,502,576 | 3/1996 | Ramsay et al. | 358/444 |
| 5,508,731 | 4/1996 | Kohorn | 348/1 |
| 5,524,073 | 6/1996 | Stambler | 380/24 |
| 5,535,276 | 7/1996 | Ganesan | 380/25 |
| 5,548,726 | 8/1996 | Pettus | 395/200.09 |
| 5,577,209 | 11/1996 | Boyle et al. | 395/200.06 |
| 5,862,223 | * 1/1999 | Walter et al. | 380/25 |
| 5,878,139 | * 3/1999 | Rosen | 380/24 |
| 5,889,958 | * 3/1999 | Willens | 713/201 |
| 5,898,154 | * 4/1999 | Rosen | 380/24 |

* cited by examiner

Primary Examiner—Robert W. Beausoliel
Assistant Examiner—Pierre E. Elisca
(74) Attorney, Agent, or Firm—Jones, Tullar & Cooper, P.C.

(57) ABSTRACT

A secure network architecture method and apparatus that provides security at all levels of the network. The system and method of the present invention provides communications profiles for all network resources that uniquely identify the individual network resources and provide for absolute object identity. Communications over the network are managed at all levels by the network resources themselves by virtue of individual communications profiles that are policed by arbitrators and network resources alike.

67 Claims, 13 Drawing Sheets

SECURE NETWORK ARCHITECTURE METHOD AND APPARATUS

FIELD OF THE INVENTION

Figure 1:
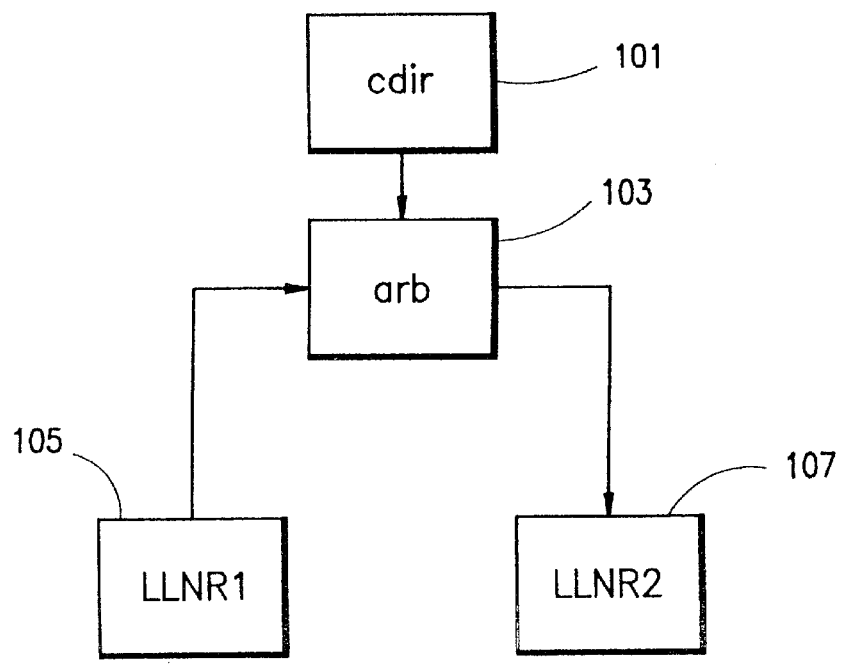

This invention relates generally to computer system network architectures. More particularly this invention relates to a system for creating and maintaining a secure network architecture allowing transmission of data and information when permitted and/or allowed to be accepted by a destination.

BACKGROUND

With the advent of computer networks has come the problem of secure communication over a network. In addition it is important in networks dealing with critical business transactions of an organization to have controls over who can send what information over the network and, as an added precaution, what network resources are permitted to accept what kinds of information.

Network architectures have been the subject of a great deal of inventive effort. For example, U.S. Pat. No. 5,548,726 to Pettus is granted for a "System For Activating New Service in Client Server Network by Reconfiguring the Multi-layer Network Protocol Stack Dynamically Within the Server Node." This invention allows for a client, in a client server network, to access remote services by means of a communications directory located in each node of the network. The activities of the client are then controlled by the server which allows only certain activities to take place. Thus the client is effectively controlled by the server.

U.S. Pat. No. 5,577,209 to Boyle et al. was granted for an "Apparatus Invented for Providing Multi-level Security for Communication Among computers and terminals on a Network." This system is a multi-level security system employing a secure network interface unit between each host computer, user computer and the network. This system also provided for security management architecture for controlling operation and configuration of the secure network interface units. Each secure network interface unit is configured to perform certain defined activities. Thus control in the network is achieved by virtue of a secure network interface unit. Presumably limitations on activities of workstations on the network are also controlled by the secure network interface unit.

Other types of architectures have attempted to control processing on the network by imparting to servers or network computers certain controls over the processing taking place on the network. U.S. Pat. No. 5,355,453 to Rew et al. describes a system where all networks are connected to a network controller unit for controlling what traffic is permitted on the network.

U.S. Pat. No. 5,287,537 to Newmark et al. was granted for "Distributing Processing System Having a Plurality of Computers Each Using Identical Retaining Information to Identify Another Computer For Executing a Received Command." This system causes a computer that receives a command to forward that command to another if the first computer can not fulfill the command. The emphasis here is on the ability to shift processing to computers that can perform the desired task.

U.S. Pat. No. 5,502,576 to Ramsay et al was granted for a "Method and Apparatus for the Transmission, Storage, and Retrieval of Documents in An Electronic Domain." This invention has a particular structure that facilitates processing time and achieving higher bandwidth over a network. Traffic on the network is concerned with maximizing the bandwidth of information that is sent over the network.

U.S. Pat. No. 5,109,385 to Tseung was granted for a "Guaranteed Reliable Broadcast Network." This invention introduces a concept of an "arbitrator node" which manages traffic over the network in order to guarantee that a message is received by a particular network resource even though the resource may be busy, slow, or temporarily out of service. Thus the arbitrator node performs the function of a "traffic cop."

Other inventions in the network security arena relate to methodologies of encryption, for example U.S. Pat. No. 5,295,188 to Wilson et al for "Public Encryption and Decryption Circuitry and Method," U.S. Pat. No. 5,351,293 to Michener et al for a "System Method and Apparatus for Authenticating an Encrypted Signal," and U.S. Pat. No. 5,226,079 to Holloway for "Non-repudiation in Computer Networks."

Other patents have been granted for authentication and signature verification. For example, U.S. Pat. No. 5,189,700 to Blandford was granted for "Devices to 1) Supply Authenticated Time and 2) Time Stamp and Authenticate Digital Documents," and U.S. Pat. No. 4,326,098 to Bouricius et al for a "High Security System for Electronic Signature Verification." These and other tools provide certain software solutions whereby one party can sign a digital document and another party can authenticate from the source that the message is truly from a desired party.

These various approaches deal with control over the messages on a network as well as various forms of centralized control over traffic on the network.

However, it would be extremely useful if controls over network traffic, once established by a central authority were automatically enforced by every single network resource (that is, without limitation, all manner of workstations, modems, servers, and other equipment and software residing on the network). Thus, the solution to not only network security but also to the security of the types of transactions on a network could best be enforced if rules existed not only at the network server or node level but also at the workstations originating the traffic, the various network resources along the way to the transaction destination, and enforced by the destination network resource as well. By having these enforcement mechanisms at all locations within the network, network security is enhanced for all manner of transactions or operations on the network. Further, network bandwidth usage decreases since, typically, only those communications that are permitted are ever transmitted on the net.

SUMMARY OF THE INVENTION

It is therefore an object of the present invention to provide a network with enhanced integrity and security in the transmission and reception of information by various network resources.

It is a further object of the present invention to establish communications profiles for all network resources whereby the ability of such network resources to create, transmit, and receive information is defined for the network resources.

It is a further object of the present invention to provide arbitrator nodes as a type of network resource able to control network traffic and having knowledge of important, relevant characteristics of network resources connected to such arbitrators.

It is a further object of the present invention to create individual network resource communications profiles whereby a network resource on the network will be permitted to create only certain types of traffic.

It is a further object of the present invention to create individual network resources having a communications profile comprising certain types of communications which the network resource is capable of creating and certain types of communication (which may be different) which the network resource is capable of receiving.

It is a further object of the present invention to be able to encrypt a bitstream based upon communications profiles of the receiving network resources whereby the receiving network resource will be able to decrypt the bit stream only if the encrypted bitstream comprises information the receiving network resource is permitted to receive.

It is a further object of the present invention to create an arbitrator capability that stores and monitors the individual network resource communications profiles after network resources have been established by the arbitrator to insure that only appropriate traffic emerges from a network resource.

It is yet another object of the present invention to create an arbitrator which monitors the usage of the network resources, software on the network, and information by various network resources.

It is a further object of the present invention to create an arbitrator having knowledge of other network resources which are destinations for traffic and for which the arbitrator only sends the traffic which the destination network resources are permitted to receive.

It is a further object of the present invention to individualize encryption elements to effect a unique dialect in the form of a communications profile for communication with each network resource.

It is a further object of the present invention to create and pre-store encryption elements for later distribution to network resources over the network when needed.

It is a further object of the present invention to allow arbitrators to request encryption elements as needed from a central directory or other arbitrators to fulfill the communication needs of network resources.

It is a further object of the present invention to allow a central directory to establish the communications profile of new network resources connected to arbitrators as a means of establishing initial communications between new network resources and arbitrators.

It is a further object of the present invention to establish communications profiles for network resources whereby the network resources understand and monitor incoming traffic and accept only traffic that the network resource is allowed to accept by virtue of its communications profile.

It is a further object of the present invention to insure that network traffic cannot be modified at any point in the transmission over the network without detection of the modification made.

It is a further object of the present invention to provide absolute object identity thereby allowing system management over the network as well as to insure certainty that communications destined for a particular network resource can be received only by that destination resource.

It is a further object of the present invention to allow anonymous communication notwithstanding absolute object identity.

It is a further object of the present invention to control and manage traffic over the network and determine what traffic is permitted to be sent and received by network resources, with a minimum of human intervention.

It is a further object of the present invention to be able to permit only certain kinds of communications between various parties and limit other types of communications.

It is a further object of the present invention to provide network resource communications profiles on network resources at all levels on the network.

It is yet another object of the present invention to meter network usage in order to create use statistics, charge users for network resources used, to enable billing and to enable tracking instances of network vandalism and related network information.

It is a further object of the present invention to create a class of network resource known as containers and distributed containers comprising information, access permissions and other network resources.

It is a further object of the present invention to create containers that cannot be modified and wherein any attempted modifications result in the container not being able to be decrypted.

It is a further object of the present invention to be able to identify corrupted files for subsequent retransmission to a destination network resource.

It is a further object of the present invention to provide known-object storage with absolute object identity in a container such that users can be certain that information retrieved from a container has not been modified or otherwise changed or tampered with.

These and other objects of the present invention will become apparent to those skilled in the art by review of the specification that follows.

For purposes of this specification, the term "network resource(s)" refers to, without limitation, software, any equipment and its associated software, for example, servers, workstations, modems and other equipment as well as other software programs such as databases, spreadsheets, and containers, (e.g. groups of databases and special access to other resources).

The present invention comprises a central directory which establishes the identity and characteristics of other network resources of the system architecture. It is the function of the central directory to establish the method and type of communication to be established with various network resources, to assist in establishing profiles and the identities of the network resources by distributing communication and network resource profiles and to distribute cryptographic elements to the network resources.

The Central Directory (CDIR) has the job of generating initial communications profiles for all network resources. Principally these are for lower level network resources (LLNRs) such as, and without limitation, workstations, arbitrators, containers and distributed containers. However, it is the intention and within the scope of the present invention for all network resources of any type to have communications profiles associated with them. To accomplish this the CDIR receives unique random numbers from a unique random number generator of the system and together with other communication filters, generates an initial communications profile that contains a unique identifier for the network resource in question and "receive" and "transmit" permissions for allowing communications of certain types to and from the network resource in question. Additionally, the CDIR can regenerate communications profiles in cases where original communications profiles have been corrupted or become unuseable.

The CDIR also performs checks to ensure that communications profiles together with other unique identifiers are not the same as for other network resources. This insures and establishes absolute object identity. Absolute object identity is a key issue that has been a source of problems on networks that is, the positive identification of those network resources on the network. It is important to have assurances that the network resource with whom a party is exchanging information is in fact the network resource for whom the information is intended. Conversely, it is important to have assurance that the source of information is in fact the source desired.

As described above, the actions of the unique random number generator and the actions of the CDIR in guarantying the absolutely unique nature of numbers being generated assures that each communications profile is in fact unique. If it is not unique, the CDIR reports the error to the unique random number generator and requests a new random number from the unique random number generator to establish the unique communications profile. Since the basis for each network resource's existence on the network is a function of its communications profile, which in turn is a function of the unique identifier given to it by the CDIR, other network resources can be assured that information coming from or going to a network resource is uniquely destined for that network resource or coming from the network resource as the case may be.

Once the communications profile is generated, the CDIR stores the communications profile for later distribution to a new arbitrator, or if the profile is for a LLNR, for the distribution to the LLNR by the associated arbitrator. Through such storage of network resource communications profiles, the CDIR is able to reestablish communications on a network resource in the event the communications profile becomes unuseable.

When the need arises for the creation of a new entity on the network and the distribution of a communications profile, such as when a new network resource is brought on line, the CDIR receives a request for a communications profile from a loader that is passed through an associated arbitrator. The loader is an applet whereby the CDIR can load an appropriate communications profile onto a network resource. Thereafter, the arbitrator receives the communications profile from the CDIR and passes the communications profile to the LLNR to allow communications to be established with the network. The arbitrator also stores the communications profile so that it can monitor communications from the LLNR. The CDIR or arbitrators have the power to reject a request for a communications profile in the event that the request is somehow improper.

The CDIR also stores the status of arbitrators and LLNRs on the net. For example the CDIR notes whether a network resource is active or inactive (i.e the account is active or dormant). The CDIR also stores needed information regarding the owner of the network resource. In the event anonymous communications are required, an alias identifier is used in place of the true identity of the network resource during communications but the CDIR still maintains the historical information of the true identity of the aliased communications.

The CDIR is assisted in the task of establishing the network by a plurality of arbitrators. The arbitrator takes information from the CDIR to establish and/or modify its own identity and its own communications profile and further assists the CDIR in establishing the communications profile of various network resources that communicate with the arbitrator.

When a network resource needs to become established on the network, the arbitrator is contacted in order to establish for the network resource a communications profile by which the network resource can interact and exist on the network and receive communications from the arbitrator and other network resources. If the arbitrator does not have the appropriate information or communications profiles to pass down to the network resource, the request to become active on the network flows to higher arbitrators and may even reach the CDIR. If the arbitrator has the appropriate information to establish the communications profile, the arbitrator provides it to the network resource and to the CDIR for record keeping purposes. In either case, a completed communications profile flows from either the arbitrator or the CDIR, through the arbitrator, to the network resource.

Once the network resource is established on the network, it has a communications profile associated with the information and communications it can generate and put over the network, as well as a communications profile associated with the type of information it is authorized to receive. In addition each network resource has a unique identifier. Only communications that have precisely the correct identifying information and are of the type of communication permitted can be received by the LLNR. Similarly, the network resource cannot generate or transmit any communication not expressly permitted by its communications profile. In this fashion an individual network resource polices itself both from the standpoint of what information it can send, and what information it can receive. Further, any tampering with the network resource communications profile and identifiers changes the LLNR to make both the sending and receiving of information impossible. This in turn triggers an automatic repair/update of the LLNR communications profile.

As further assistance to establishing integrity over the network an arbitrator (or plurality of arbitrators) serves as a second line of defense on the network to monitor the traffic that is coming from the network resources connected to it for purposes of metering usage, billing users, collecting statistics on use, and other statistics and to insure that it is the kind of traffic that the network resource is authorized to send. This is accomplished by the arbitrator maintaining an extensible database of profiles of all of those network resources with whom it most commonly communicates. Thus the communications profile of a particular network resource is generally mirrored at the arbitrator so that the arbitrator can then monitor traffic coming from the particular network resource. In a similar fashion the arbitrator can review the network resource communications profile in question so that traffic that is going to the network resource from other areas of the network is precisely the kind of traffic that the particular network resource is authorized to receive. If it is not then the arbitrator does not permit the communication traffic to reach the network resource. Thus network bandwidth is not wasted sending communications that cannot be accepted.

In the unlikely event that the arbitrator does, for some reason, pass communications traffic for which the network resource is not authorized, the network resource itself continues to monitor traffic coming to it and filters that traffic via its own network profile to determine whether or not it can accept traffic that is coming to it. If the network resource communications profile does not permit such information, the traffic coming to the network resource is simply rejected (or in the case of encrypted traffic not decrypted/not processed) and a message may be sent back to the arbitrator that unuseable data was sent or that an error in communication has occurred. In an interactive communication session, the arbitrator is notified of any problem in the communication.

A first arbitrator can also have knowledge of the communications profile of subsequent arbitrators along the network with whom the first arbitrator is permitted to communicate. Thus a first arbitrator will have knowledge of the communications profile of a second arbitrator and vice versa. After first checking its own communication profile to determine if it can transmit the communication, the first arbitrator will only send a communication to the second arbitrator where the second arbitrator has authorization to receive it. Similarly the first arbitrator will only accept information and traffic from the second arbitrator that the second arbitrator has authorization to transmit. Again in the event that there is a breakdown of some type in communication, the first arbitrator is self monitoring in that it will only accept traffic from other network resources, including arbitrators, that the first arbitrator is authorized to receive. Any traffic of a type that the first arbitrator is not authorized to receive is simply rejected and an error message may be sent to the next higher level arbitrator or to the CDIR that an error in communication has occurred. Thus, in a larger network with more layers of arbitrators, an arbitrator encountering a communications error would notify a higher level arbitrator of the error noted.

The arbitrator has a series of functions that affect the traffic on the network especially that flowing to and from LLNRs. The arbitrator monitors changes and usage of the LLNRs connected to it for communications that are transmitted by the LLNR. When communications are generated the arbitrator enforces the profiles to filter LLNR communication for the LLNR. This means that the arbitrator uses its stored LLNR communications profile to ensure that communications coming from the LLNR are the type permitted to be sent or transmitted by the LLNR. This is in addition to the self-policing done by the LLNR as a result of its own stored communications profile.

The arbitrator also enforces its own communications profile. This means that the arbitrator constantly monitors communications it receives to ensure that it only receives communications which it is authorized to receive.

When a communications profile must be updated at the LLNR, the arbitrator receives information from an authority authorized to change communications profiles and passes those profile changes on to the LLNR. This can occur in situations where the LLNR is given additional permissions to create certain types of communications, as frequently happens when a person's job responsibilities change.

The arbitrator may also have the task of monitoring the health of LLNRs that communicate with it. This may take the form of timed queries to the LLNR for information about its status. When the arbitrator detects that a corrupted file, communications profile or other problem exists on the LLNR, the arbitrator can download a special loader applet comprising the LLNR communications profile to reestablish the LLNR identity and hopefully fix the corrupted file without human intervention or assistance.

When encrypted communications are desired, the arbitrator provides the necessary encryption elements to the LLNR, which may be a bit ring. Thereafter, when the LLNR communicates in an encrypted form over the network, the arbitrator can check the communications to ensure that it is progressing normally in an encrypted fashion.

It is important to note that, notwithstanding any LLNR problems, the arbitrator continues to communicate with other arbitrators, the CDIR, and with containers and distributed containers.

In order for communications over the network to occur in a secure fashion, the communications can be encrypted. When encrypted communications are to take place, the network resource desiring to communicate in a secure fashion requests from the arbitrator a cryptographic element to establish an encrypted transmission. This may take the form of a bit ring in the preferred embodiment but this can be any form of cryptographic element. Again however the type of transmission and subject matter must be something for which the network resource is permitted to operate.

The present invention also comprises a "loader" applet whereby the CDIR can load an appropriate communications profile onto a network resource. Network resources in this case can be an arbitrator or an individual workstation on the network. Network resources can also be a "container" comprising data that is updated periodically or comprising data links to other data sources.

The present invention can also establish a distributed container comprising multi-system/multi-location data, different accesses to data sources (including containers within containers) and access to other network resources grouped in a coherent manner that is distributed across the network but is to be accessed by various LLNRs. Again the CDIR establishes the communications profile associated with the distributed container, establishing what can be written to or received from the distributed container and what information or network resource accesses can the distributed container actually contain.

Thus in all phases of the network established by the present invention, checking and self-monitoring occurs to insure that, at all levels of the network, network resources check themselves to insure that only permitted communications are sent by the network resources, that only permitted communications are received by the network resources, that arbitrators monitor those network resources connected to them to insure that those network resources are sending information that they are permitted to send and receiving information they are permitted to receive. Further the arbitrators check themselves to insure that they are only receiving communications that the arbitrators are permitted to receive and sending communications they are permitted to send. Absent harmony among these various rules and linkages, communication that is unauthorized cannot take place.

All modifications to communications using the present invention can be detected by virtue of an encrypted CRC/ECC that is sent with both the encrypted and unencrypted communications. Thus if communications cannot be decrypted due to a modification (whether surreptitious or otherwise), a new transmission can be requested. As further enhancement to the integrity of this system, communications may be encrypted to allow privacy to the communications that are sent over the network. Thus the network becomes suitable for highly secure transactions, electronic commerce, and all manner of communication where privacy, security, and integrity of information are desired. For example, a distributed container could allow a plurality of banks to access a synchronized database of funds that could not be rendered into an out-of-synchronization status.

The present invention can exist on any network, including the Internet. Companies can use the present invention to establish intranets as well as local area networks with enhanced security, maintainability, and network resource access. The LLNR's of the present invention comprise any equipment that is capable of storing and/or executing computer instructions. For example, workstations of any nature typically can be LLNRs as can smart modems which have an on-board processor and microchip capability. In this manner, a communication profile can be established on the modem itself to accept certain types of communications and not others. A printer having microprocessor control can be a LLNR since it can be instructed to accept certain printing tasks and not others.

The LLNR also conducts a variety of activities. As noted earlier the LLNR performs its own internal checking on the communications it generates. When the LLNR requires encrypted communication with other network resources, it requests cryptographic elements from the arbitrator. Once received, the LLNR uses the cryptographic elements, which can be (but without limitation) a bit ring to process its outgoing message. The LLNR can also process incoming messages using the cryptographic elements to the extent that incoming communications passed to it by the arbitrator are encrypted.

If the LLNR detects that its communications profile is corrupted in some way, it can reload from its own internal storage or request a reload of its communications profile from the arbitrator. Alternatively, if this is not detected at the LLNR, the arbitrator may detect corrupted files. In such a case the LLNR merely accepts the reload when sent from the arbitrator.

Since a special procedure is required to establish anonymous communications with another network resource, the LLNR also generates requests to the arbitrator for such anonymous communications.

The LLNR can also send requests for additional communication permissions to the arbitrator. This may be required in the event that the LLNR must now communicate with a network resource, or in a particular way about a particular topic that has not until that time been permitted. Thus the LLNR also has the capability, after request and higher level approval, to add or remove filters if such addition and removal is authorized. This general processing of communications profiles is necessary so that the LLNR communications profile can be updated from time to time.

Arbitrators of the present invention would preferably be but not limited to Pentium® class processors having 32 megabytes of RAM and several gigabytes of storage. Arbitrators also would preferably have network interface cards or potentially modems.

The CDIR of the present invention would be a fault tolerant machine due to the importance of the creation, storage, and communication of communications profiles, having multiple hard drives, at least a Pentium® class processor, at least 32 megabytes of RAM, and rigorous security access limitation hardware and software.

Further information concerning the operating of the secure network architecture of the present invention will be appreciated from the detailed description that follows.

LIST OF FIGURES

Figure 2:
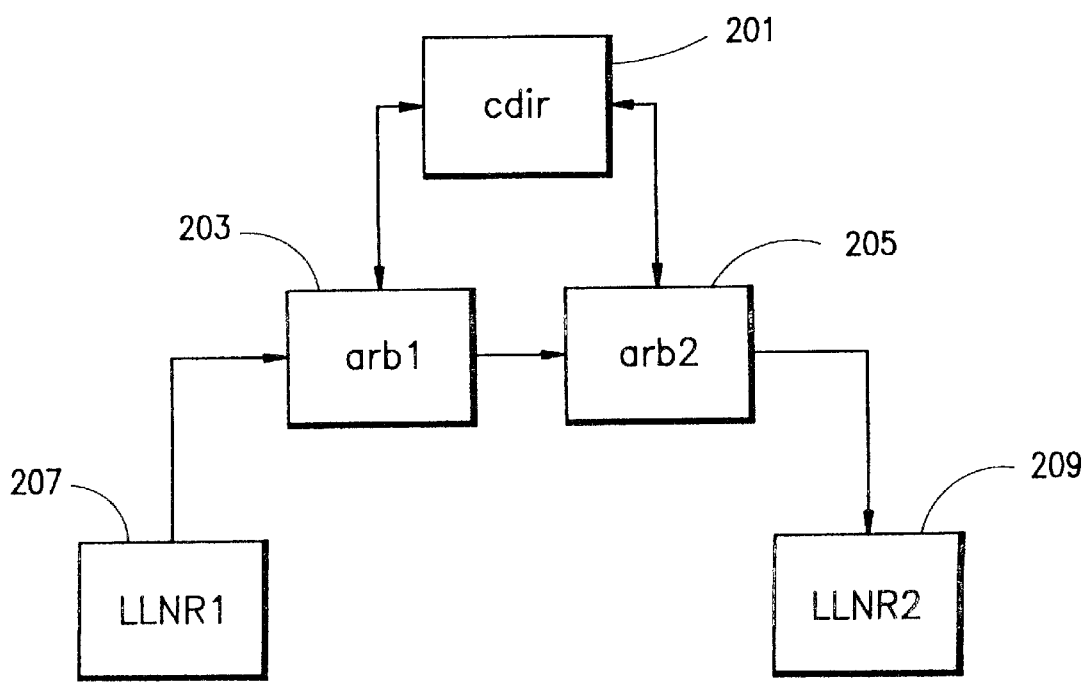
Figure 1A:
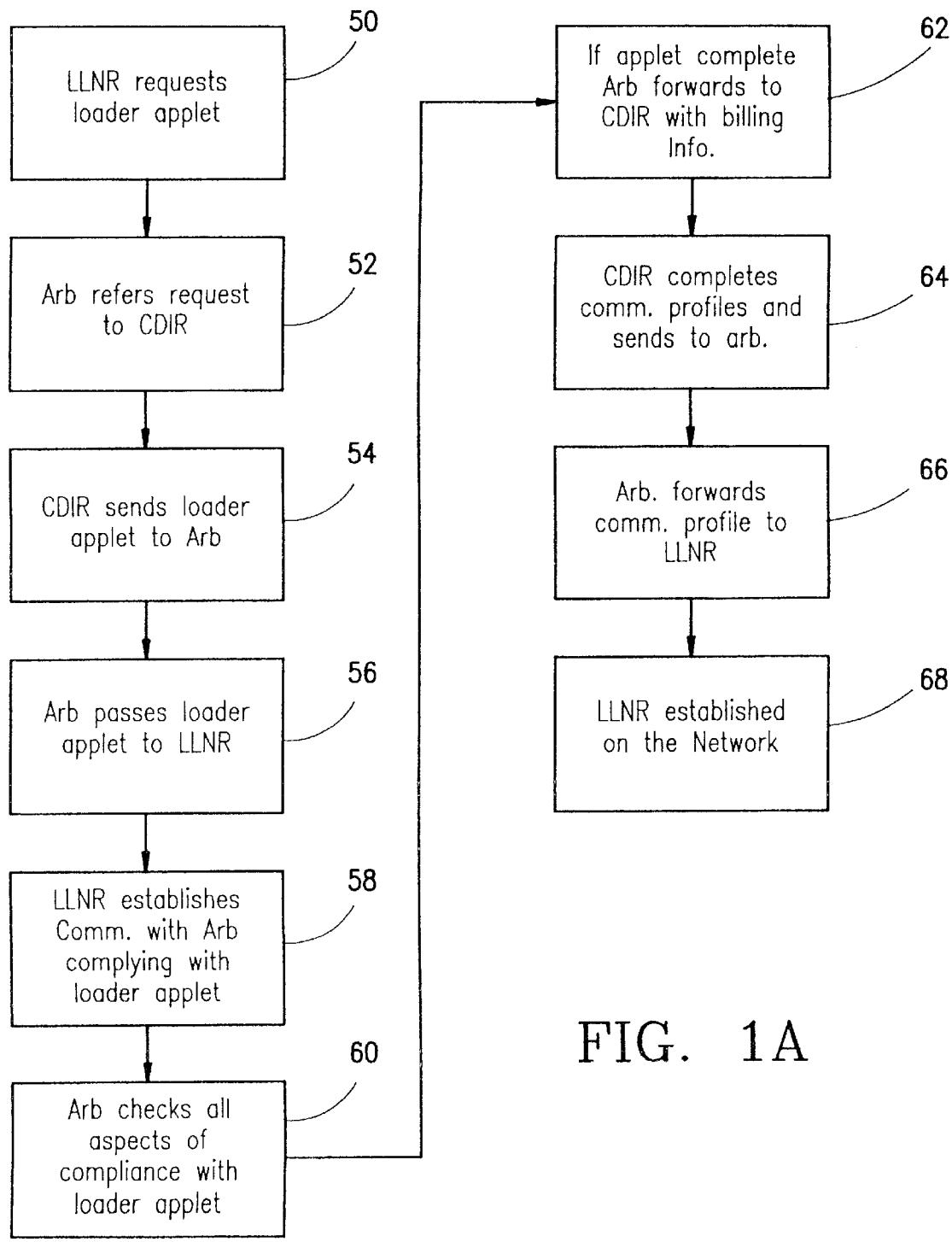
Figure 3:
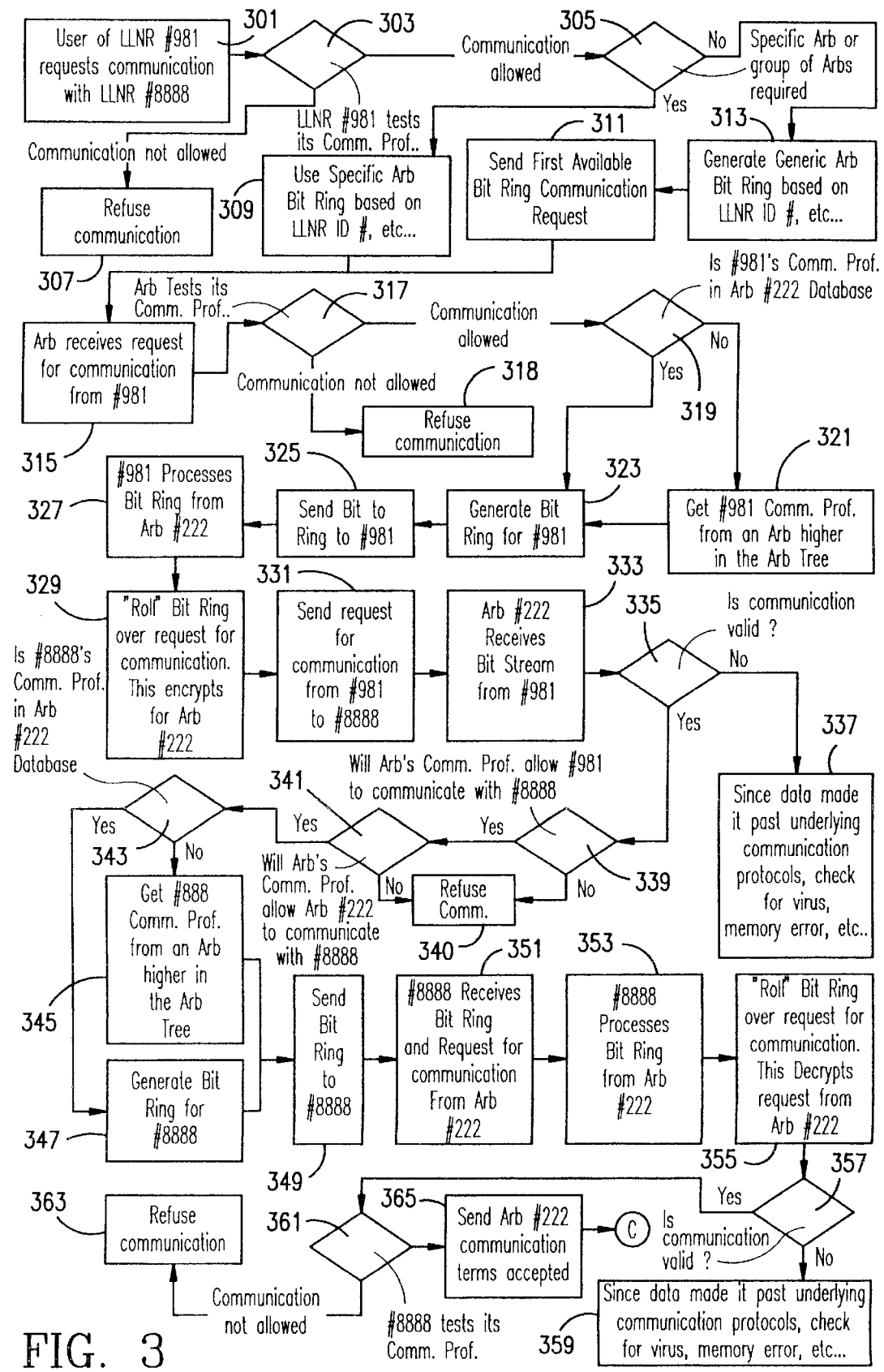
Figure 3A:
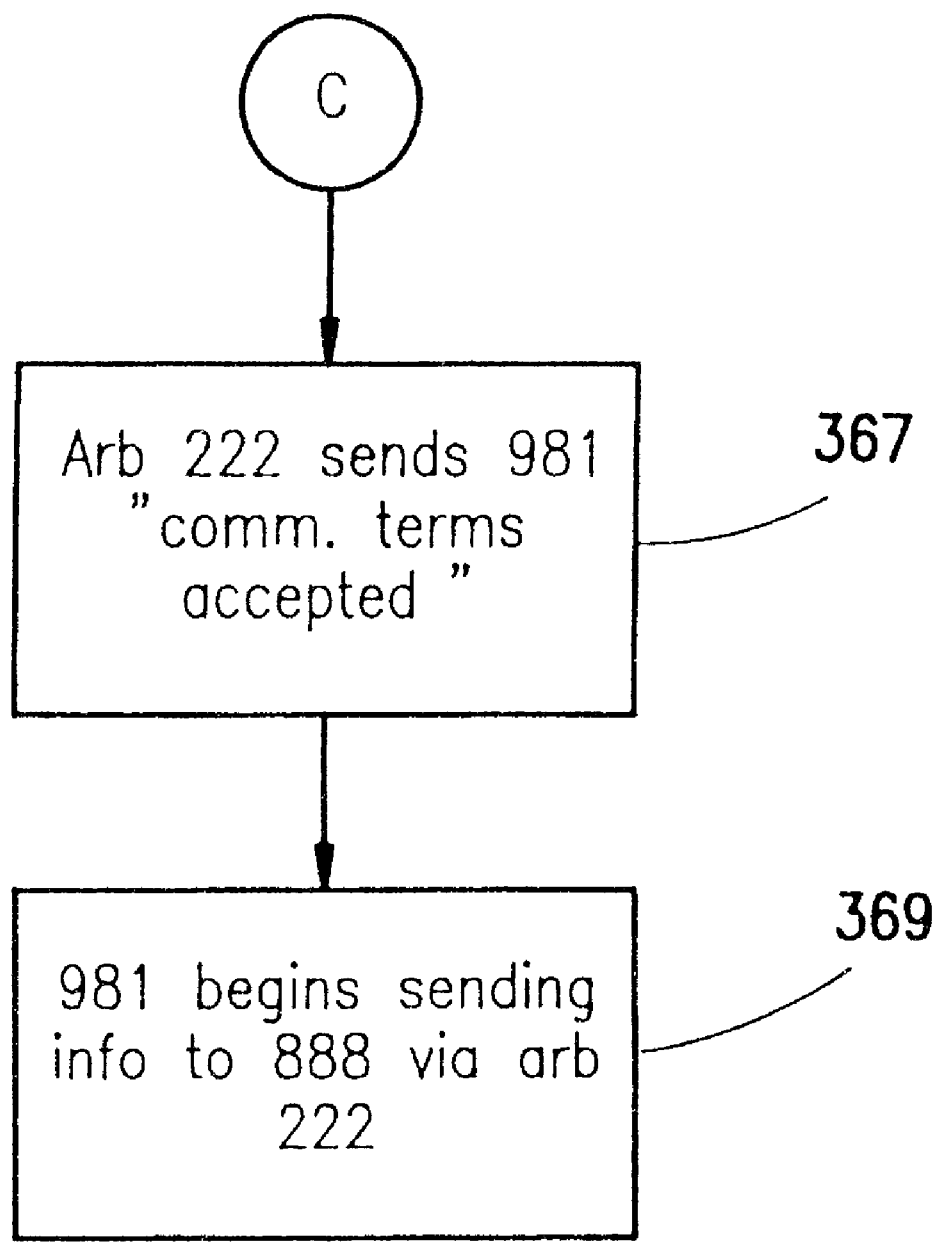
Figure 4:
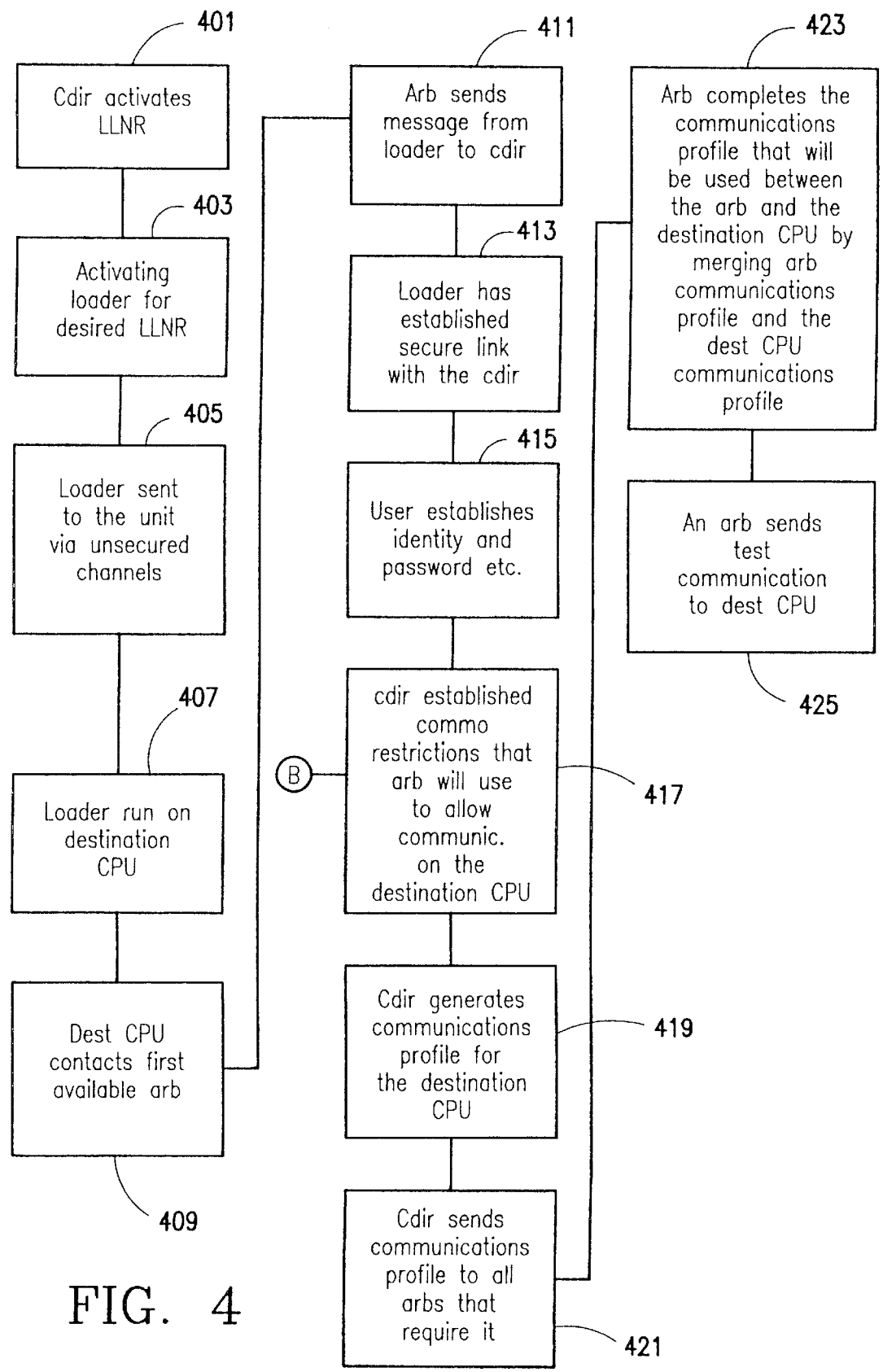
Figure 5:
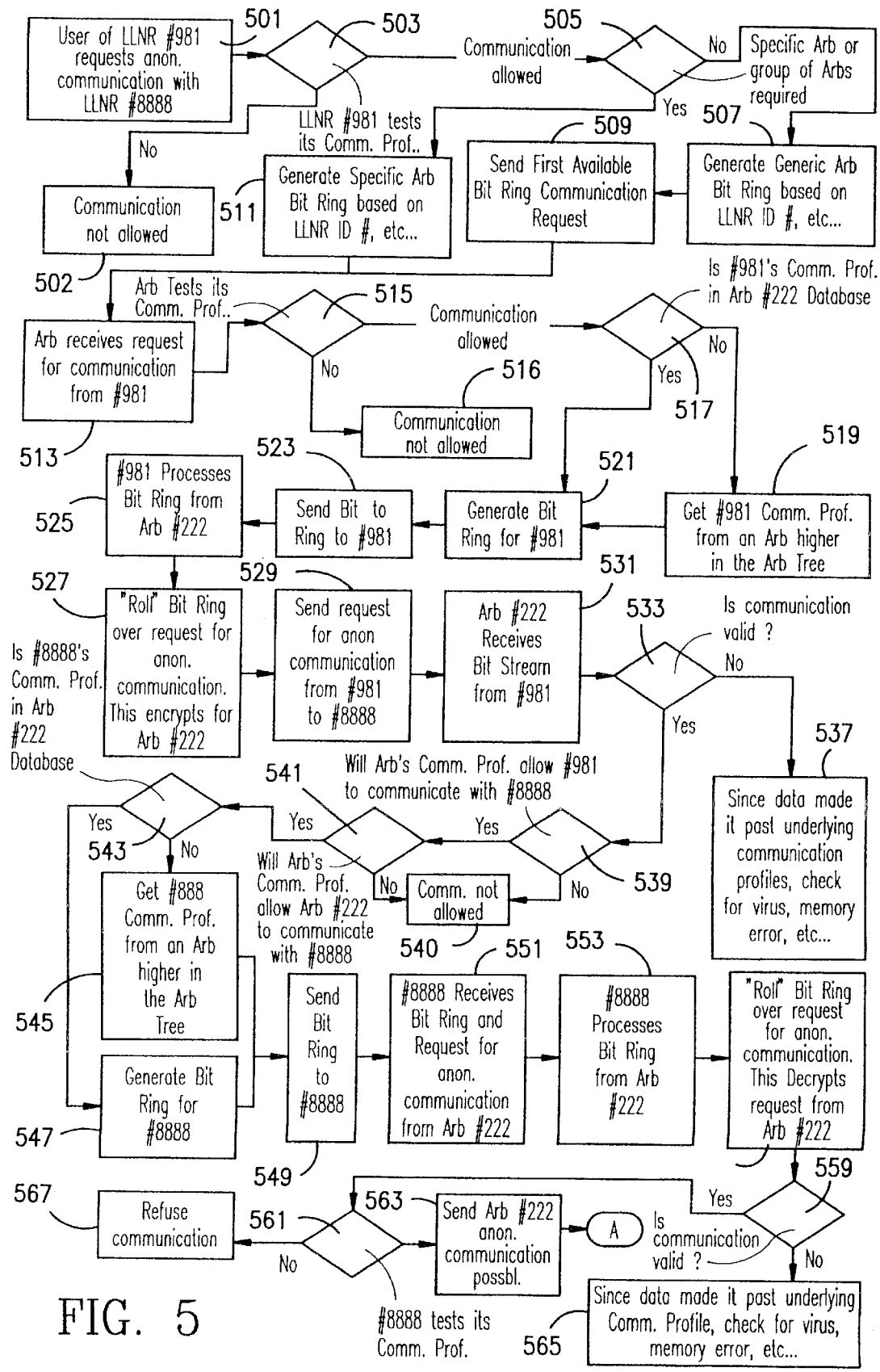
Figure 6:
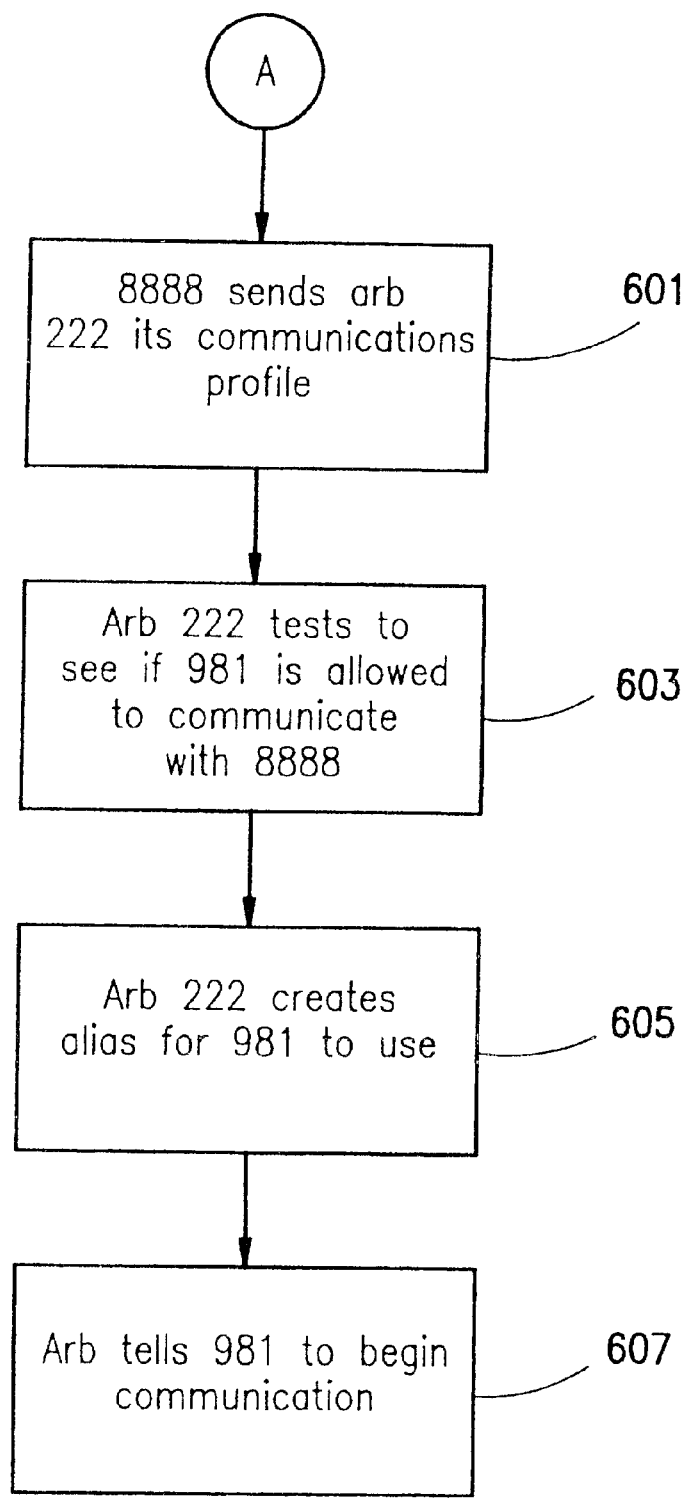
Figure 7:
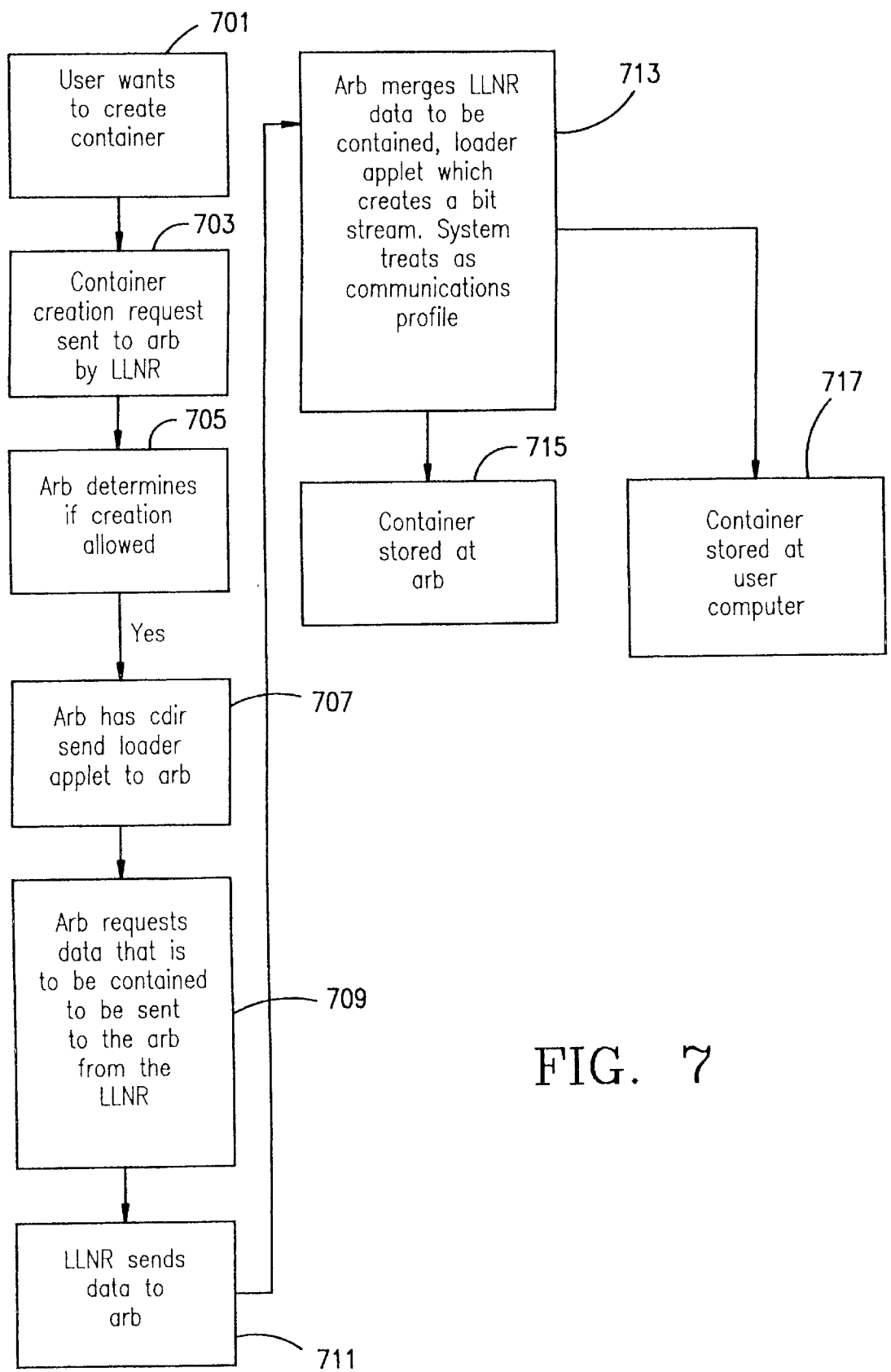
Figure 8:
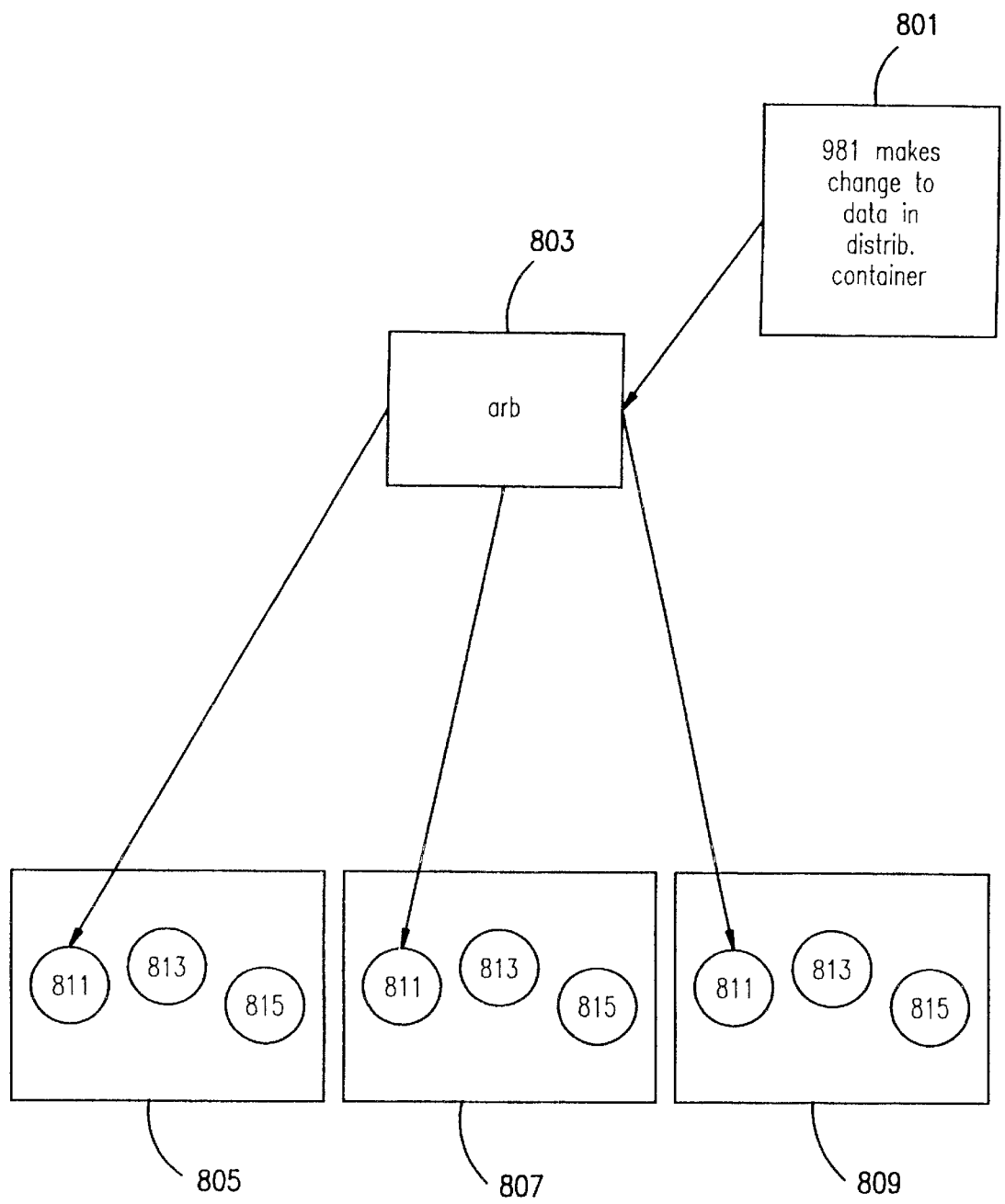
Figure 9:
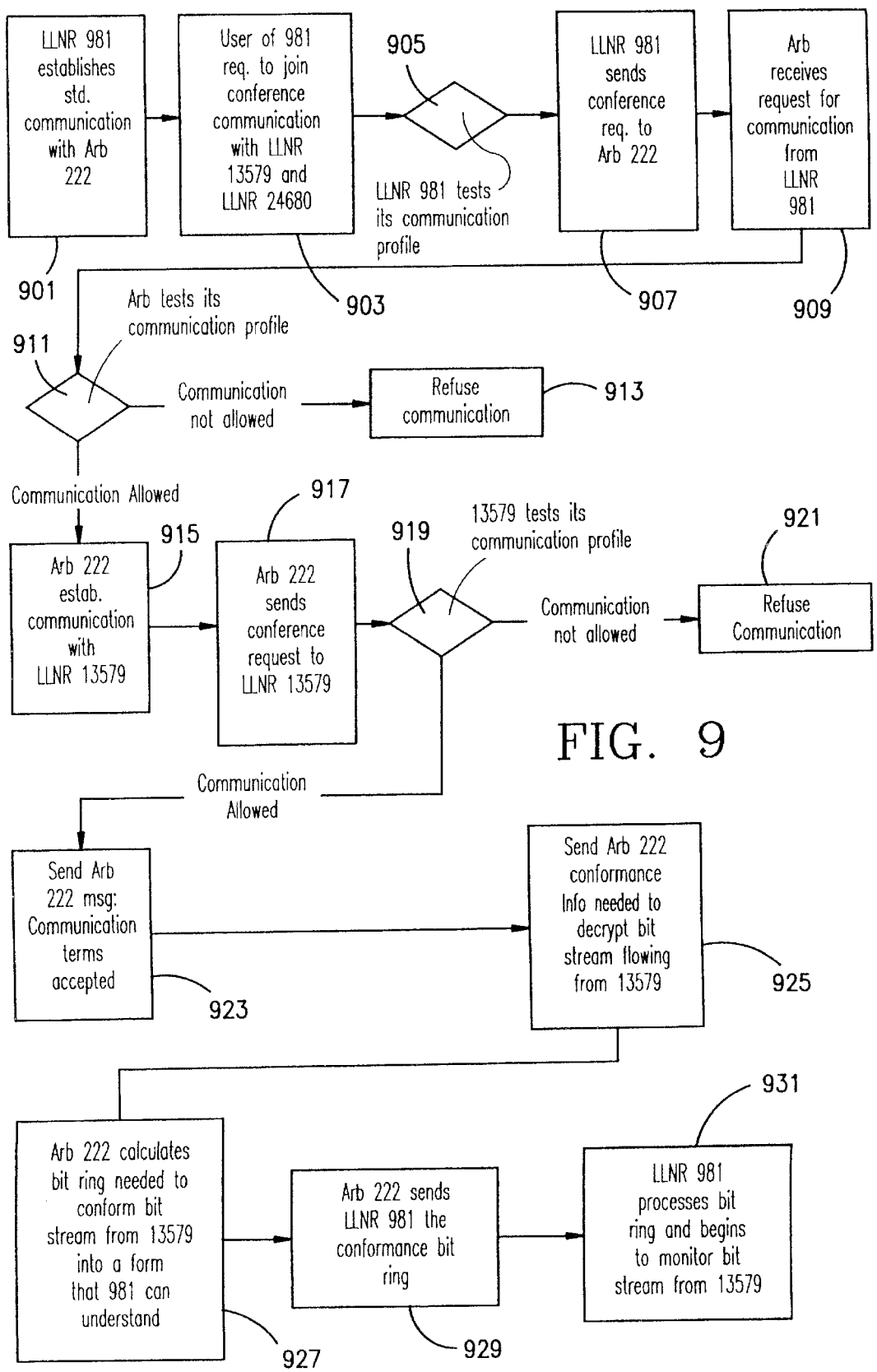
Figure 10:
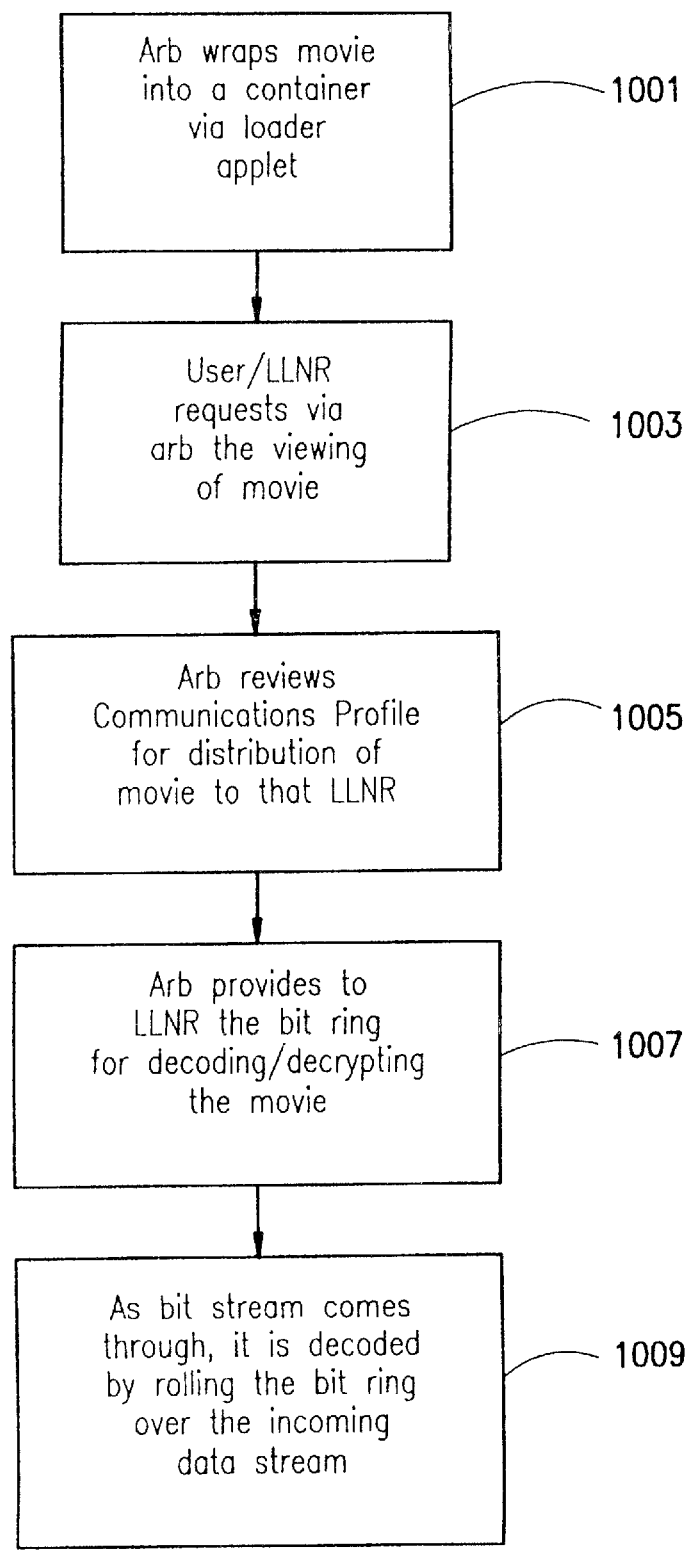
Figure 11:
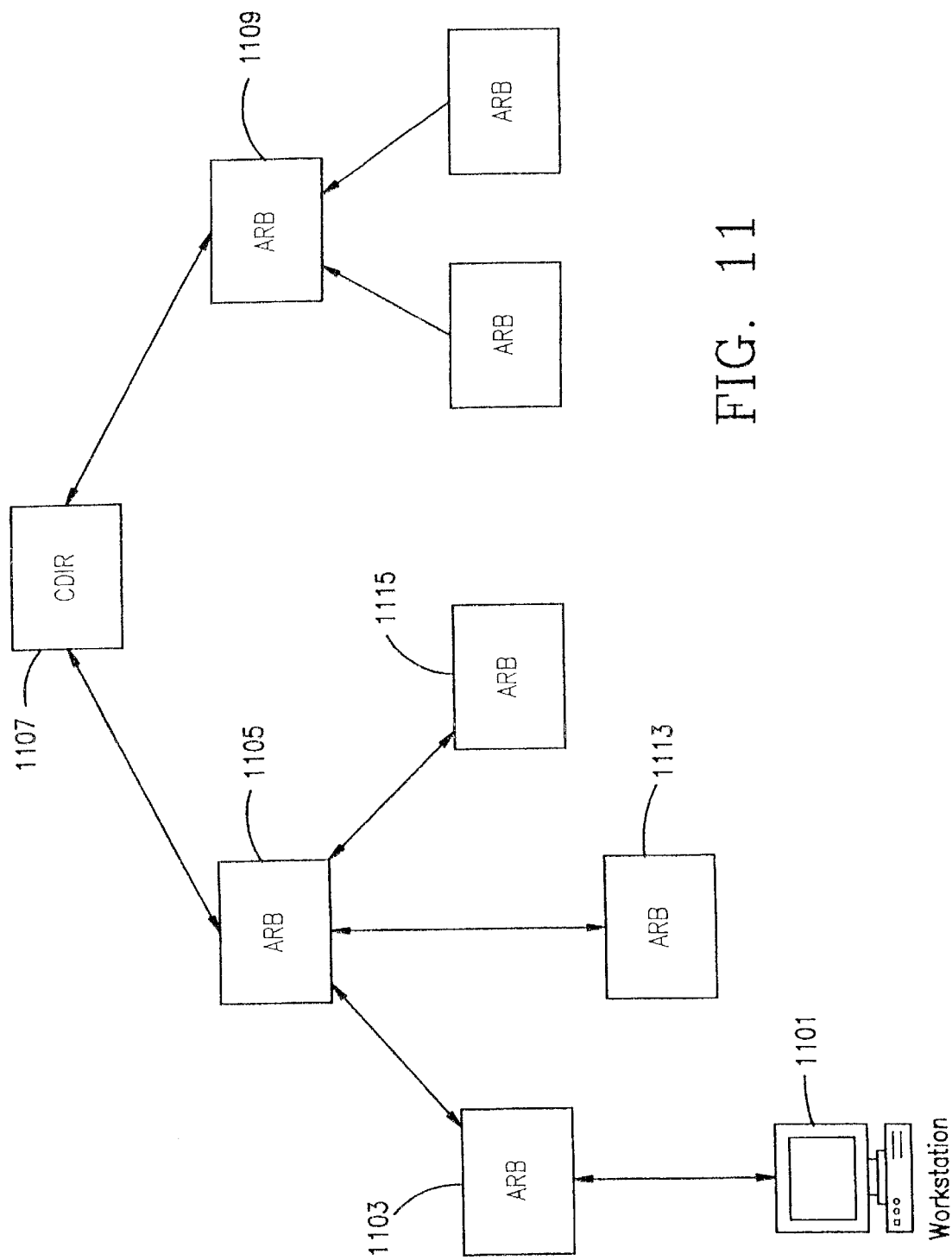
Figure 12:
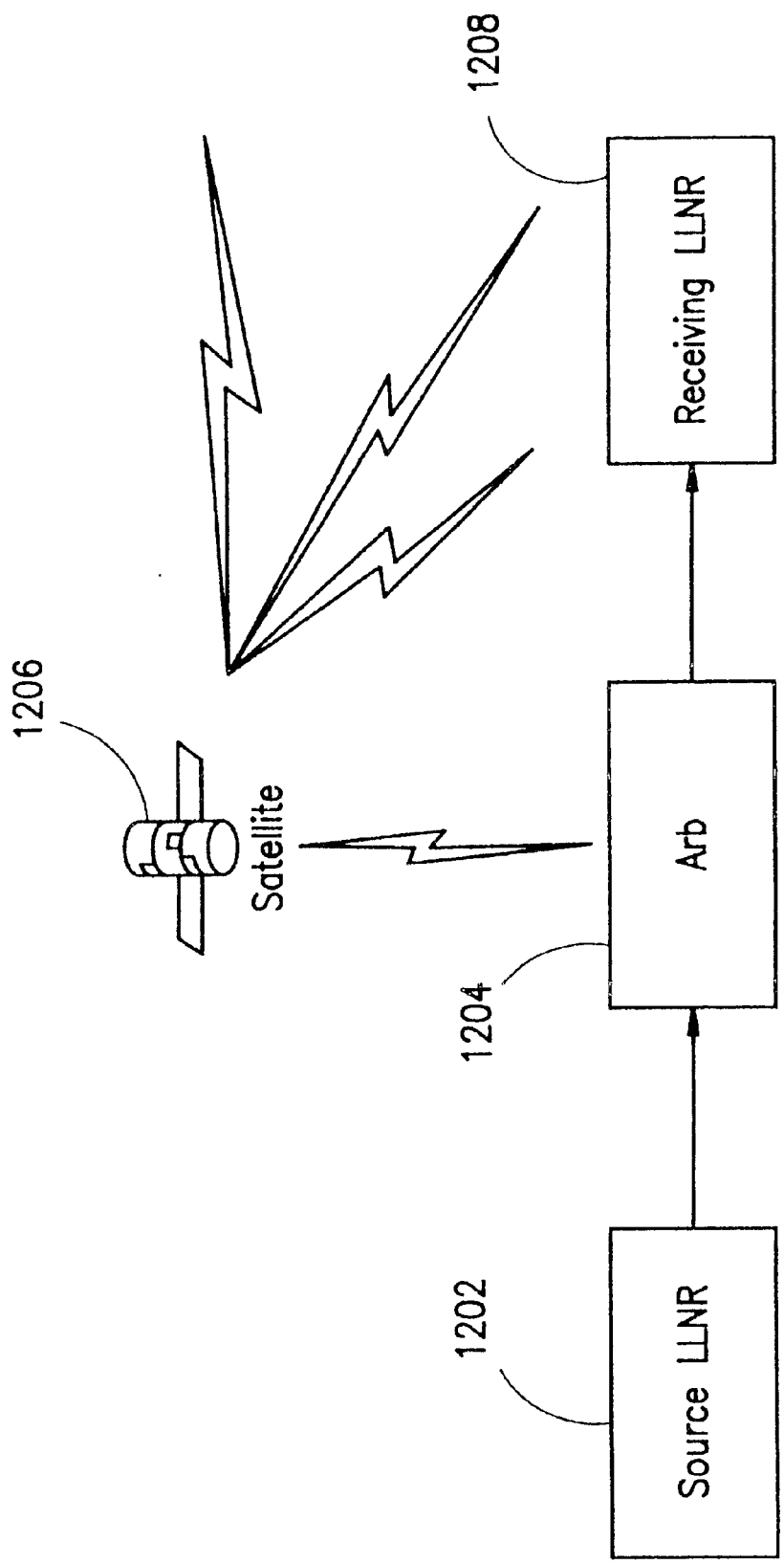

FIG. 1A is the basic Flow of Establishing a Lower Level Network Resource on the Network FIG. 1 is the Basic System Overview with a Single Arbitrator Showing Communication Between 2 Lower Level Network Resources FIG. 2 is an Alternate System Overview with Two Arbitrators Showing Communications Between 2 Lower Level Network Resources Using 2 Arbitrators FIG. 3 shows a Typical Communication Between Two Network Resources via Arbitrators FIG. 3A shows the continuation of Communication Between Two Network Resources via Arbitrators FIG. 4 shows the Activation of a Network Resource FIG. 5 describes how Anonymous Communication Between Network Resources Occurs FIG. 6 continued Description of Anonymous Communication Between Network Resources FIG. 7 describes the Creation of a Container FIG. 8 describes a Distributed Container FIG. 9 describes Conferencing of Multiple Network Resources FIG. 10 describes an Example of a Container of the Present Invention FIG. 11 describes the procedure for establishing the presence of a LLNR on the Network FIG. 12 describes The Present Invention Operating with Bit Stream Information

DETAILED DESCRIPTION OF THE PREFERRED EMBODIMENT

Referring to FIG. 1A the basic steps in establishing the presence on the net of a LLNR is shown. The LLNR first requests a "loader" applet from the nearest arbitrator to establish a presence on the net 50. The arbitrator refers the request to the CDIR 52. The CDIR then sends the appropriate loader applet 54 to the arbitrator for subsequent transmission to the LLNR 56.

Thereafter the LLNR loads the loader applet and complies with requests for information contained therein 58. The LLNR then establishes communication with the arbitrator. The arbitrator next checks all compliance by the LLNR with the requirements of the loader applet 60. If the applet is sufficiently complete, the arbitrator forwards the LLNR information to the CDIR 62. The CDIR then completes the communications profile for the LLNR and sends the profile to the arbitrator 64.

Upon receipt of the communications profile from the CDIR, the arbitrator stores a copy of the profile and sends the profile to the LLNR 66. Upon receipt and processing, the LLNR is then established on the network 68.

Referring to FIG. 1, communication between two LLNR's is shown. When an arbitrator desires to establish a network resource on the network it requests an appropriate communications profile and unique identifier from the CDIR 101. The arbitrator 103 then establishes the existence of the LLNR 105 using the communications profile from the CDIR. In a similar fashion the second LLNR 107 is also established. When LLNR 105 wishes to communicate with LLNR 107, LLNR 105 provides its message encrypted with its own bit ring to arbitrator 103. Arbitrator 103 uses its own bit ring which further encrypts the message and provides that message to LLNR 107 which then has the capability to decrypt the message. This entire process will be described in more detail later.

Referring to FIG. 2, communication between two LLNRs resources is shown via separate arbitrators. Similar to FIG. 1 the CDIR 201 provides an appropriate communications profile and unique identifier to establish LLNR 207 through an arbitrator 203 assigned to that LLNR. Similarly an appropriate communications profile and unique identifier is established for LLNR 209 and is provided via arbitrator 205 which is assigned to communicate with network resource 209. In this case, LLNR 207 provides its message encrypted according to its own bit ring to arbitrator 203. Arbitrator 203 uses its own bit ring to further encrypt the message and send it to arbitrator 205. Arbitrator 205, with knowledge of the encryption capability of network resource 209 further encrypts the message so that network resource 209 can decrypt it. Again further information on communications profile applied to this transaction will be discussed below.

Referring to FIG. 3, the typical communication between two network resources via arbitrators is described. For purposes of illustration these will be referred to as LLNR 981 and LLNR 8888. The user of LLNR 981 desires to communicate with LLNR 8888 and sends a request for communication 301. LLNR 981 then reviews its communications profile 303 to determine if communication with LLNR 8888 is permitted. If communications are not permitted, further communication is refused 307. In establishing the LLNR, various communication permissions are established as part of the communications profile of the LLNR. In the event that communications are not permitted a message is displayed to the user or other appropriate action is taken. If communications are permitted, the system next determines if a specific arbitrator or a group of arbitrators is required 305. A specific bit ring for the arbitrator is then used 309 to code the information to be sent to a specific arbitrator. If the communication is non-specific with respect to a given arbitrator, a "first available arbitrator bit ring" is created which discloses the identity of LLNR 981 but does not otherwise provide additional encrypted protection 313.

If a specific arbitrator or group of arbitrators is required, a specific arbitrator bit ring based upon the identity of LLNR 981 is generated. In the case where an arbitrator is not specified, the first available arbitrator bit ring is applied to the communication request 311. Whether the communication is a specific or a general communication request, the arbitrator receives the request for communication from LLNR 981 315. The arbitrator then tests its communications profile 317 to determine if communication is allowed with the destination LLNR. This is in effect a second communications check which adds further security to the overall system. If communications are not allowed, the arbitrator is able to so note and forbid the communication 318 from taking place sending a message to LLNR 981. For purposes of identification the initial arbitrator in this FIG. 3 is noted as "ARB 222."

ARB 222 next checks to determine if the communications profile of LLNR 981 is in the database of ARB 222 319. If this communications profile is not present, ARB 222 can obtain that communications profile from an arbitrator higher in the arbitrator tree of the system 321. Once the communications profile of LLNR 981 is in place, a bit ring for LLNR 981 communication is generated 323. That bit ring is then sent to LLNR 981 325. LLNR 981 then processes the bit ring from ARB 222 327.

Using the bit ring from ARB 222, LLNR 981 applies the bit ring to its request for communication with ARB 8888 329. This encrypts the communication between ARB 981 and ARB 222. LLNR 981 then sends its request for communication with LLNR 8888 331 to ARB 222. ARB 222 receives the encrypted bit stream from LLNR 981 333 and determines if the communication is a valid one 335.

If the communication is not valid ARB 222 performs certain system health checks to determine if a virus is present, if there are difficulties with memory, or other types of errors 337. If the communication is valid ARB 222 next determines if its own communications profile will allow LLNR 981 to communicate with LLNR 8888 339. If the communication is not valid for any reason, communication is refused 340. The ARB 222 next checks to determine if its own communications profile allow it to communicate with LLNR 8888 341. If such communication is permitted, ARB 222 next determines if LLNR 8888 communications profile is in ARB 222's database 343. If the communication is not permitted, communication is refused 340. If the LLNR 8888 communication profile is not in the database, ARB 222 obtains the communications profile from an arbitrator higher in the arbitrator tree of the system 345. If the communications profile of LLNR 8888 is present in ARB 222's database, a bit ring for communicating with LLNR 8888 is generated based on the LLNR 8888 communications profile 347.

The generated bit ring is next sent to LLNR 8888 349. LLNR 8888 receives the bit ring and request for communication from ARB 222 351. LLNR 8888 then processes the bit ring from ARB 222 353 and applies the bit ring to the request for communication 355. This in effect decrypts the request for communication from ARB 222. LLNR 8888 then determines if the communication is valid 357. If the communication is not valid LLNR 8888 performs certain system checks to attempt to isolate the problem noted 359. If the communication is valid LLNR 8888 tests its communications profile 361 to determine if it is permitted to accept communication from ARB 222 and/or LLNR 981. This is in effect a third check on whether the communication is valid. In the event that LLNR 8888's communications profile does not allow it to accept the communication, the communication is refused and a message is sent to ARB 222 363. If the communication from ARB 222 is accepted 365 then communication between LLNR 981 and LLNR 8888 can continue.

Referring to FIG. 3A, 8888 sends a message noting that the communication terms are accepted to Arb 222 365. Thereafter Arb 222 sends the "communication terms accepted" message to 981 367. LLNR 981 then can begin to send its information to Arb 222 369 for subsequent transmission to 8888.

Referring to FIG. 4, the activation of a LLNR 401, or indeed any network resource, is described. The CDIR is the entity that activates a LLNR. A particular loader applet is configured for the desired LLNR 403 and sent to the LLNR, which comprises a user's computer or other network resource, via the unsecured channels 405. The loader applet is then run on the destination LLNR or network resource 407. The destination LLNR contacts the first available arbitrator 409 noting that it is ready to be established as a LLNR on the network. The arbitrator then sends a message from the loader applet at the LLNR to the central directory 411. By virtue of the loader applet message sent from the LLNR to the CDIR, the loader applet has established a secure link between the destination computer and the CDIR 413. The LLNR then establishes its own identity and password 415 which becomes part of its communications profile. (Note: a "computer" is used simply as an example of one type of "network resource." The use of this piece of equipment is by way of example only and is not meant to limit the type of network resource that could be in place).

The CDIR next establishes various communication restrictions that an arbitrator will use to allow communication by the LLNR 417. These restrictions are passed to both the arbitrator and the LLNR. The CDIR then generates a communications profile for the LLNR 419. This communications profile is then typically sent only to arbitrators in direct link with LLNR 419 above the LLNR on the network 421. The arbitrator then completes the communications profile that will be used between that arbitrator and the LLNR by merging the arbitrator's communications profile and the communications profile for the LLNR 423. This creates a unique communications profile which can only be used between the LLNR and the arbitrator. The final step in the LLNR establishment process is for an arbitrator to send a test communication message to the LLNR to ensure that communications are operating properly 425.

Referring to FIG. 5, the situation relating to anonymous communication between LLNR's is described. Anonymous communication may be desired when interest is being expressed in certain financial transactions, if medical test results are being reviewed and other private matters. Anonymous communication begins and is carried on in a similar fashion to normal communications over the network. Using the same number identification as noted previously, LLNR 981 requests an anonymous communication with LLNR 8888 501. LLNR 981 tests its communications profile to determine if anonymous communication with LLNR 8888 is allowable 503. If communication is not allowed a message may be displayed for the user so noting 502. If communication is allowed, LLNR 981 determines if a specific arbitrator or group of arbitrators is required 505. If a specific arbitrator or group of arbitrators is not required a generic bit ring based on the LLNR 981 I.D. is generated 507. This results in a request for the first available arbitrator to enable communication 509.

If a specific arbitrator or group of arbitrators is required a specific arbitrator bit ring based on the LLNR I.D. and the arbitrators to be contacted is generated by LLNR 981 511. It should be noted that these steps 503, 505, 507, 509, and 511 are performed by the LLNR 981 based upon its own communications profile and data downloaded to it from the central directory.

The request for anonymous communication with LLNR 8888 is then transferred to ARB 222 which receives the request for communication 513. ARB 222 then tests its communications profile to determine if such anonymous communication is allowed 515. If communication is not allowed 516, a message is sent from the arbitrator to LLNR 981 to that effect. Assuming the communication is allowed, arbitrator next determines if LLNR 981's communications profile is in the ARB 222's database 517. If that communications profile for LLNR 981 is not present, ARB 222 will request the communications profile from an arbitrator higher in the arbitrator tree of the system 519. Once the communications profile is obtained or it is found by the ARB 222 that the communications profile is in the database of ARB 222 a bit ring is generated for LLNR 981 521. That bit ring for anonymous communication is sent to LLNR 981 523.

Thereafter LLNR 981 receives the bit ring and processes that bit ring from ARB 222 525. LLNR 981 then applies the bit ring to the request for anonymous communication 527 which serves to encrypt the communication between LLNR 981 and ARB 222. Thereafter the encrypted request for anonymous communication is sent from LLNR 981 to LLNR 8888 via ARB 222 529. ARB 222 receives the encrypted bit stream from LLNR 981 531 and determines if this is a valid communication 533.

If communication is not valid due to protocol errors or other system difficulties, ARB 222 will perform system checks in order to isolate the problem 537. If the communication is valid, ARB 222 will check its stored communications profiles to determine if LLNR 981 is permitted to communicate with LLNR 8888 539. Assuming that such communication is permitted, ARB 222 determines if its own communications profile will allow it to communicate in an anonymous fashion with LLNR 8888. If communication is not permitted, the transmission of information will not take place 540. If ARB 222 is permitted communication with 8888 541 then ARB 222 will check its database to determine if the communications profile for LLNR 8888 is in the ARB 222 database 543. If ARB 222 is not permitted to communicate with 8888, then communication is not permitted 540. If the LLNR 8888 communications profile is not in the database of ARB 222, ARB 222 requests the communications profile from arbitrators higher in the arbitrator tree of the system 545. If the communications profile is in place in the database of ARB 222, ARB 222 generates a bit ring for communicating with LLNR 8888 547. Thereafter, the bit ring is sent to LLNR 8888 549 and is received by LLNR 8888, which includes the request for anonymous communication from ARB 222 551. It is important to note that at this juncture, the identity of LLNR 981 is not given, only that anonymous communication is to be sent from ARB 222.

LLNR 8888 processes the bit ring from ARB 222 553. The bit ring is applied to the request for anonymous communication that was previously encrypted. This in effect decrypts the request for anonymous communication from ARB 222 557. Thereafter, LLNR 8888 performs a check to determine if the communication is valid 559. If communication is not valid due to errors in protocol or other difficulties, LLNR 8888 performs a limited system check to determine the problem encountered 565. If the communication is valid, LLNR 8888 tests its communications profile 561 to determine if it is permitted to accept anonymous communication from ARB 222. If its communications profile determines that it cannot accept such a communication, the communication is refused 567 and a message so indicating is sent to ARB 222. If anonymous communication can be accepted by LLNR 8888, then LLNR 8888 sends ARB 222 a message noting that anonymous communication is possible 563.

Referring to FIG. 6, the flow of anonymous communication continues. LLNR 8888, after determining that anonymous communication is possible, sends ARB 222 its communications profile concerning the type of communication it can receive 601. ARB 222 tests to see if LLNR 981 is permitted to communicate with LLNR 8888 based upon LLNR 8888's communications profile 603. If communication is permitted, ARB 222 creates an alias for LLNR 981 to use for the communication 605. Thereafter, ARB 222 informs LLNR 981 to begin its communication 607. Thereafter, during that anonymous communication all communication having the identity of LLNR 981 is converted to the alias which is assigned to the communication by ARB 222.

Referring to FIG. 7, the creation of the container is described. The container is in effect a storage structure wherein data, network resources and access to network resources that can be accessed by other network resources are stored. When a particular network resource requires a container for storage of data, network resources and access to network resources it must initially establish that requirement 701. The individual LLNR cannot by itself create a container but can request the creation of the storage structure. The LLNR sends a container creation request to an arbitrator 703. The arbitrator reviews its own communications profile to determine if creation of a container by the arbitrator is permitted 705. If creation of containers by the arbitrator is permitted the arbitrator sends a message to the CDIR to send a loader applet to the arbitrator 707. Once the loader applet is in place, the arbitrator requests data, network resources and access to network resources which are to be contained to be sent to the arbitrator from the LLNR 709. Thereafter the LLNR sends the appropriate data, network resources and access to network resources to be contained to the arbitrator 711. The arbitrator next merges the LLNR data, network resources and access to network resources and any communications profile information from the LLNR, together with the loader applet from the arbitrator to create an encrypted bit stream 713. The container is then stored by the arbitrator 715, or in the alternative, the container may be stored at the user computer 717. A key element that maintains the integrity of the data that is stored in a container is the fact that any individual user cannot modify the data stored in the container unless the container is accessed via the arbitrator (as illustrated in this figure. There may be more than one arbitrator that can allow changes to be made to information stored in containers). Data in containers cannot be modified without the appropriate authority since each container also has a communications profile that notes from whom it can receive modifications and what type of modifications are possible. For example a container may have many "read" permissions as part of its communications profile so that others may read data stored therein. However, the profile would potentially contain very few "write" permissions in order to limit the extent to which it can accept commands to change the data or access to network resources stored in the container. In a similar fashion to the unmodifiable nature of communications over the net, data in containers, if modified in any unauthorized manner, cannot be decrypted, thereby thwarting the attempted unauthorized modification.

Referring to FIG. 8, the concept of a distributed container is shown. If LLNR 981 desires to make a change 801 it notifies the arbitrator 803 and inputs the value to be changed to the arbitrator. The arbitrator sends a message to all the distributed containers 811 and the various locations (illustrated as locations 805, 807, and 809) that it, the arbitrator, wants to make a change to the distributed container and what that change will be. All containers 811 respond that they are willing to accept the change and communicate this acceptance to the arbitrator. Prior values of the data or network resource accesses to be changed are stored in each distributed container as a "roll back value," that is a value which may be restored in the event of difficulty in changing all of the information in the various distributed containers. The arbitrator next notes that all distributed containers have acknowledged the potential message change. Upon a given signal from an arbitrator or at a particular appointed time all distributed containers make the change requested and delete the rollback value. In this fashion all distributed containers having the same data are synchronized so that entities at location 805, 807, and 809 are all accessing the same data and that data is known to be the same at all locations. It should be noted that in FIG. 8, for purposes of illustration, other distributed containers are noted as 813 and 815, each of which is stored at each individual location 805, 807, and 809.

Referring to FIG. 9, the ability to conference multiple LLNR's using the system and method of the present invention is shown. LLNR 981, which desires conference communication establishes its standard communication with ARB 222 901. The user of LLNR 981 requests to join the conference to communicate with LLNR's identified for purposes of this example as LLNR 13579, and LLNR 24680 903. LLNR 981 tests its communications profile to ensure that it is permitted to not only communicate with LLNR 13579 and LLNR 24680 but that it is also permitted to engage in conference communication 905. LLNR 981 sends its conference request to ARB 222 907. ARB 222 receives the request for communication from LLNR 981 909 and tests its own communications profile to determine if conference communication with the other LLNR's is permitted 911. If communication is not permitted communication with the other desired LLNR is refused 913 and a message is sent to LLNR 981 to that effect.

If conference communication is allowed, ARB 222 establishes communication with LLNR 13579 915. Arb 222 then sends a conference request to LLNR 13579 917. LLNR 13579 receives the conference request from ARB 222 and tests its own communications profile to determine if communication with ARB 222 is permitted 919. If communication is not permitted communication is refused 921 and a message is sent to ARB 222 to that effect. If communication is allowed LLNR 13579 sends to ARB 222 a message noting that the communication terms are accepted 923. Thereafter ARB 222 sends "conformance information," that is information that is needed to decrypt the bit stream flowing from ARB 222 to LLNR 13579 925. ARB 222 then calculates the bit ring needed to conform the bit stream from LLNR 13579 into a form that LLNR 981 can understand 927. Thereafter ARB 222 sends LLNR 981 the conformance bit ring 929 and LLNR 981 processes the bit ring and begins to monitor the bit stream from LLNR 13579 931.

Referring to FIG. 10, an example of a container in the present invention is illustrated. In this case an example of a movie being distributed via over the present invention is shown. In this case the arbitrator first wraps a movie into a container via a loader applet 1001. This serves to encrypt the bit stream associated with the movie. When a user at a LLNR (in this case a set top box for viewing video selections) desires to view the movie, the user requests to view the movie via the arbitrator 1003. The arbitrator then reviews its communications profile to determine if the set top box requesting to see the movie is authorized to see that particular movie 1005. Such a filter can be a parental control filter noting that violent or sexually explicit movies are not to be viewed during particular time frames. Once the arbitrator determines that the set top box is permitted to see the movie requested, the arbitrator provides to the set top box the bit ring for decoding or decrypting the movie in question 1007. By virtue of the bit ring provided by the arbitrator, the arbitrator allows the bit stream associated with the movie to be decrypted by the set top box. As the bit stream reaches the set top box it is decoded by applying the bit ring sent from the arbitrator to the incoming data thereby decoding the movie and allowing it to be seen at the set top box location 1009.

Establishment of Communication

In order to initially establish a LLNR on the network, a user contacts the network to establish the need for the user to be on the net and other administrative matters such as billing etc. Once the user's identity has been established to the satisfaction of the network intake facility, the user is given access to an applet that puts the user's LLNR in direct contact with the CDIR. Thereafter, communication with the CDIR occurs to establish the communications profile of the user with the associated transmit, receive and unique identifier information that allows the user's LLNR to communicate on the net.

As the CDIR creates and transmits the LLNR profile to the new LLNR, the profile is transmitted through various levels of arbitrators to reach the destination of the LLNR. At each arbitrator, the LLNR profile is stored so that the arbitrator can conduct its communication facilitating activity.

Referring to FIG. 11 the establishment of an LLNR is shown. In the FIG. 11 two intermediate levels of arbitrators are shown. LLNR 1101 makes its request for communication via the loader applet. This request is passed through arbitrator 1103 and arbitrator 1105 and finally reaches the CDIR 1107. Once the CDIR established the required profile for the LLNR, it passes that profile back through arbitrators 1105, which stores the LLNR profile as it passes the profile on to arbitrator 1103. Arbitrator 1103 then stores the LLNR profile and passes the profile on to the LLNR where it is loaded onto the LLNR thereby allowing it to communicate on the network.

If there comes a time when the LLNR is to be denied or deleted from the network, the CDIR simply inquires of its associated arbitrators whether they have knowledge of the profile of the LLNR to be deleted. Again referring to FIG. 11, Arbitrator 1109 and 1105 are queried by the CDIR 1107. Only arbitrator 1105 responds affirmatively that it does recognize the profile of the LLNR to be deleted. Thus a message to delete the LLNR from the network is sent only to arbitrator 1105. Since no other message needs to be transmitted, bandwidth is preserved.

Similarly, arbitrator 1105 inquires of its associated arbitrators 1103, 1113, and 1115 whether they have knowledge of the LLNR to be deleted. Only arbitrator 1103 responds with any knowledge of the LLNR to be deleted. Thereafter, the instruction to delete the LLNR only goes to arbitrator 1103 and to no other thereby again saving network bandwidth.

An alternative query method to that noted above which saves bandwidth even further is that since CDIR 1107 knows that it only sent LLNR profile information to arbitrator 1105, it does not need to query any other arbitrator regarding the existence of LLNR 1101. Therefore the CDIR 1107 only notifies arbitrator 1105 of the deletion of the LLNR 1101. Arbitrator 1105 knows that it only notified arbitrator 1103 of the existence of 1101. Therefore only arbitrator 1103 is notified of the deletion of LLNR 1101. Thereafter, arbitrator 1103 sends a message to LLNR 1101 deleting its ability to access the network. In this fashion only a single channel is queried or informed of the deletion of LLNR 1101 from the network, thereby saving bandwidth even further.

Referring to FIG. 12 the operation of the present invention is shown when dealing with bit stream information. This type of information could be a video such as a movie being shown in one's home, stock quote information which is constantly being updated or any other type of continuously flowing information. A source for the bit stream 1202 transmits the information to the arbitrator 1204. Arbitrator 1204 encrypts the bit stream and sends the bit stream to a network distribution resource, in this case shown as a satellite 1206. The distribution resource could also be a cable distribution system broadcast tower distribution system or any other system capable of distributing bit stream information.

The network distribution resource broadcasts the encrypted bit stream information where it can be received by those LLNR's that have appropriate communications profile and the ability to decrypt the information being broadcast. In this example LLNR 1208 is permitted to receive the information being broadcast by distribution resource 1206. However, in order for LLNR 1208 to read the information being broadcast, it must be able to decrypt the information. In order to accomplish this, decryption elements are sent by the arbitrator 1204 to LLNR 1208. Upon loading these decryption elements, LLNR 1208 is able to read the encrypted information being broadcast by distribution resource 1206.

A secure network architecture method and apparatus has been described which provides for controls over network traffic at all network resources. It will be appreciated by those skilled in the art that other modest variations of the invention described are possible without departing from the spirit of the invention as disclosed.

I claim:

1. A secure network comprising:

a network;

network resources connected to the network each having a communications profile comprising at least a receive profile, a transmit profile, and unique identifier and whereby each network resource can receive communications only if permitted by its receive profile and whereby each network resource can transmit communications only if permitted by its transmit profile; and at least one arbitrator with its own communications profile included in said network resources, wherein the arbitrator receives communications from transmitting network resources which are destined for destination network resources and retransmits the communication to the destination network resources.

2. The secure network of claim 1 further comprising a central directory and whereby the central directory creates the communications profile for the network resources.

3. The secure network of claim 1, wherein the at least one arbitrator includes means to meter usage on the network and to provide information to a billing authority for billing users for usage.

4. The secure network of claim 1, wherein the arbitrator includes means to check a communication that is received by the arbitrator against the arbitrator's communications profile to determine if the communication is the type permitted to be received by the arbitrator.

5. The secure network of claim 4 wherein the means to check communication that is received includes means to prevent retransmission of a communication by the arbitrator that is not permitted to be received by the arbitrator.

6. The secure network of claim 5 wherein the arbitrator further comprises storage in which is stored communications profiles of the most commonly used destination network resources to which the arbitrator can transmit communications and in which is further stored communications profiles of the most commonly used transmitting network resources from which the arbitrator can receive communications.

7. The secure network of claim 6 wherein the arbitrator includes means to monitor communication coming from a transmitting network resource, to check the type of communication against the communications profile of the transmitting network resource and to permit the communication to be further transmitted only if the communication is of the type permitted by the transmitting network resource's communications profile.

8. The secure network of claim 7 wherein the arbitrator further includes means to monitor communication destined for a destination network resource, to check the type of communication against the communications profile of the destination network resource and to permit the communication to be further transmitted only if the communication is of the type permitted by the destination network resource's communications profile.

9. The secure network of claim 2, wherein the arbitrator includes means to provide a cryptographic element to a transmitting network resource in advance of the transmitting network resource transmitting any sensitive communication.

10. The secure network of claim 9 wherein the arbitrator includes means to receive cryptographic elements from the central directory in response to a request from the arbitrator.

11. The secure network of claim 9 wherein the arbitrator includes means to receive cryptographic elements from another arbitrator for subsequent transmission to the transmitting network resource.

12. The secure network of claim 2 wherein each workstation includes means to request cryptographic elements from the arbitrator when communications to be transmitted are to be encrypted.

13. The secure network of claim 12 wherein the cryptographic element is a bit ring.

14. The secure network of claim 2 wherein the central directory further comprises a database of cryptographic elements for distribution to network resources.

15. The secure network of claim 14 wherein the central directory includes means to receive cryptographic elements from a unique random number generator.

16. The secure network of claim 2, further including a unique random number generator for said central directory which creates batches of numbers in advance of any request for cryptographic elements from the central directory.

17. The secure network of claim 16 wherein the unique random number generator includes means to check the number generated against a database of already generated unique numbers and if the number has not been generated, stores the number in a batch file for later transmission to the central directory.

18. The secure network of claim 1 wherein the network resources further comprise a plurality of workstations each with its own communications profile.

19. The secure network of claim 18 wherein each workstation includes means to transmit certain types of communication only if permitted by its communications profile.

20. The secure network of claim 19 wherein each workstation includes means to receive certain types of communication only if permitted by its communications profile.

21. The secure network of claim 19 wherein each workstation includes means to check communications to be transmitted from the workstation and to permit the transmission to occur only if it is of the type permitted by the workstation's communications profile.

22. The secure network of claim 20 wherein each workstation includes means to check communications to be received from an arbitrator and to permit the reception to occur only if it is of the type permitted by the workstation's communications profile.

23. The secure network of claim 1 wherein the network resources further comprise at least one container comprising information.

24. The secure network of claim 23 wherein the information in the container comprises audio/visual data.

25. The secure network of claim 23 wherein the information in the container comprises access privileges to other network resources.

26. The secure network of claim 23 wherein the information in the container is binary data.

27. The secure network of claim 23 wherein the information in the container is software.

28. The secure network of claim 1, wherein the network resources further comprise at least one container comprising encrypted information.

29. The secure network of claim 28, further including means to prevent decryption of information in the container upon any modification to the encrypted information.

30. A method for establishing a secure communications network comprising:
    establishing a communications profile comprising at least a receive profile, a transmit profile, and unique identifier on each of a plurality of network resources including at least one arbitrator on a network;
    transmitting communications from a transmitting network resource only if permitted by the transmitting network resource's communications profile; and
    receiving communications by a destination network resource only if permitted by the destination resource's communications profile.

31. The method of establishing a secure communication network of claim 30 wherein the network resources comprise a plurality of arbitrators.

32. The method of establishing a secure communication network of claim 30 further comprising:
    receiving by the arbitrator a communication transmitted by a transmitting network resource destined for a destination network resource; and
    re-transmitting the communication to the destination network resource.

33. The method of establishing a secure communication network of claim 32 further comprising:
    checking the received communication against the communications profile of the arbitrator;
    accepting the communication for re-transmission if it is the type of communication permitted to be received by the arbitrator; and
    rejecting the communication for further re-transmission if it is the type of communication not permitted to be received by the arbitrator.

34. The method of establishing a secure communication network of claim 30 further comprising:
    storing in the arbitrator the communications profiles of network resources with which communication is permitted.

35. The method of establishing a secure communication network of claim 34 further comprising:
    checking the communications profile of the destination network resource stored in the arbitrator;
    rejecting re-transmission of the communication to the destination network resource if the communication is not of the type permitted to be received by the destination network resource; and
    allowing re-transmission of the communication to the destination network resource if the communication is of the type permitted to be received by the destination network resource.

36. The method of establishing a secure communication network of claim 35 further comprising:
    the network resource requesting cryptographic elements from the arbitrator when communications are to be encrypted.

37. The method of establishing a secure communication network of claim 36 wherein requesting cryptographic elements includes requesting a bit ring.

38. The method of establishing a secure communication network of claim 30 wherein establishing a communications profile on each of a plurality of network resources further includes establishing a plurality of workstations each with its own communications profile.

39. The method of establishing a secure communication network of claim 38 further comprising transmitting from a workstation certain types of communications only if permitted by the workstation's communications profile.

40. The method of establishing a secure communication network of claim 39 further comprising receiving certain types of communications only if permitted by the workstation's communications profile.

41. The method of establishing a secure communication network of claim 39 further comprising the workstation checking the communication to be received and permitting the reception only if the communication is of the type permitted by the workstation's communications profile.

42. The method of establishing a secure communication network of claim 38 further comprising the workstation checking the communication to be transmitted and permitting the transmission only if the communication is of the type permitted by the workstation's communications profile.

43. The method of establishing a secure communication network of claim 38 further comprising the workstation requesting cryptographic elements from the arbitrator when communications are to be encrypted.

44. The method of establishing a secure communication network of claim 43 wherein the cryptographic element is a bit ring.

45. The method of establishing a secure communication network of claim 43 further comprising the arbitrator requesting a cryptographic element from a central directory in response to the request for a cryptographic element from a workstation.

46. The method of establishing a secure communication network of claim 38 further comprising supplying cryptographic elements to the arbitrator from a central directory in response to a request from the arbitrator.

47. The method of establishing a secure communication network of claim 46 further comprising the central directory receiving batches of unique random numbers from a unique random number generator; and generating bit rings from the unique random numbers received by the central directory.

48. The method of establishing a secure communication network of claim 47 further comprising the unique random number generator checking a unique random number database to ensure that the number generated is in fact unique;

storing unique random numbers generated in a batch file for transmitting to the central directory.

49. The method of establishing a secure communication network of claim 30, further including establishing at least one container comprising information for said network resources.

50. The method of establishing a secure communication network of claim 49 further comprising encrypting the information in the container.

51. The method of establishing a secure communication network of claim 50 wherein modifying the information in the container results in the container not being able to be decrypted.

52. The method of establishing a secure communication network of claim 49 including providing audio/visual data for said container.

53. The method of establishing a secure communication network of claim 49 including providing access privileges to other network resources for said container.

54. The method of establishing a secure communication network of claim 49 including providing binary data for said container.

55. The method of establishing a secure communication network of claim 49 including providing software for said container.

56. The method of establishing a secure communication network of claim 30 further comprising the arbitrator receiving a communication from a transmitting network resource;

the arbitrator encrypting the communication and retransmitting the encrypted communication to a network distribution resource;

the network distribution resource broadcasting the encrypted communication;

the arbitrator providing to a destination network resource a means to decrypt the encrypted communication broadcast from the network distribution resource.

57. The method of establishing a secure communication network of claim 56 wherein re-transmitting to a network distribution resource includes re-transmitting the communication to a satellite.

58. The method of establishing a secure communication network of claim 56 wherein encrypting the communication includes producing an encrypted bit stream.

59. The method of establishing a secure communication network of claim 56 including providing audio/visual data to said transmitting network resource for communication to the arbitrator, said encrypted communication comprising encrypted audio/visual data.

60. The method of establishing a secure communication network of claim 56 including providing binary data to said transmitting network resource for communication to the arbitrator, said encrypted communication comprising encrypted binary data.

61. The method of establishing a secure communication network of claim 56 including providing software to said transmitting network resource for communication to the arbitrator, said encrypted communication comprising encrypted software.

62. The method of establishing a secure communication network of claim 56 including providing financial data to said transmitting network resource for communication to the arbitrator, said encrypted communication comprising financial data.

63. A method for creating absolute object identity for objects on a network, comprising:

providing a plurality of network resources on the network;

providing a plurality of arbitrators for receiving and retransmitting communications between network resources;

creating random numbers in a random number generator;

conveying the created random numbers to a central directory;

verifying the uniqueness of each random number in the central directory; and creating for each of said network resources a communications profile based in part on a verified random number, each created communications profile comprising at least a receive profile, a transmit profile and a unique identifier, whereby a transmitting network resource transmits communications only if permitted by its communications profile and a destination network resource receives communications only if permitted by its communications profile.

64. The method for creating absolute object identify for objects on a network of claim 63 further comprising:

receiving, by an arbitrator, communications transmitted by a transmitting network resource destined for a destination network resource; and re-transmitting the communication from the arbitrator to the destination network resource.

65. The method for creating absolute object identity for objects on a network of claim 64 further comprising:

checking a communication received by the arbitrator against the communications profile of the arbitrator;

accepting the communication for retransmission if it is the type of communication permitted to be received by the arbitrator; and rejecting the communication for further re-transmission if it is the type of communication not permitted to be received by the arbitrator.

66. The method for creating absolute object identity for objects on a network of claim 65 further comprising:

storing in the arbitrator the communications profiles of network resources with which communication is permitted.

67. The method for creating absolute object identity for objects on a network of claims 66 further comprising:

checking the communications profile of a destination network resource stored in the arbitrator;

rejecting re-transmission of the communication to the destination network resource if the communication is not of the type permitted to be received by the destination network resource; and allowing re-transmission of the communication to the destination network resource if the communication is of the type permitted to be received by the destination network resource.

* * * * *